United States Patent [19]

Davies et al.

[11] 3,919,121

[45] Nov. 11, 1975

[54] METHOD FOR PRECIPITATING PLATINUM METAL ON A SUPPORT

[75] Inventors: Ronald F. Davies, Elkton, Md.;
George J. Benvegno, Aston, Pa.

[73] Assignee: Colonial Metals, Inc., Elkton, Md.

[22] Filed: June 14, 1974

[21] Appl. No.: 479,204

Related U.S. Application Data

[62] Division of Ser. No. 348,075, April 5, 1973.

[52] U.S. Cl......... 252/466 PT; 252/472; 252/477 R
[51] Int. Cl.² ................ B01J 21/04; B01J 23/56
[58] Field of Search ............ 252/466 PT, 472, 477 R

[56] References Cited
UNITED STATES PATENTS

| | | | |
|---|---|---|---|
| 3,198,240 | 8/1965 | Keith et al. | 252/466 PT |
| 3,697,447 | 10/1972 | Bettinardi | 252/477 R |
| 3,816,344 | 6/1974 | Shimizu et al. | 252/466 PT |

*Primary Examiner*—W. J. Shine
*Attorney, Agent, or Firm*—Walter G. Finch

[57] ABSTRACT

A catalytic mixture includes a platinum-based compound, such as chloroplatinic acid or ammonium chloroplatinite, mixed with other constituents, including water. The acid could be mixed with various amounts of sodium citrate or with aluminum oxide, dextrose and triethanolamine. The ammonium chloroplatinite could be mixed with dimethyl formamide.

Each of these mixtures can be deposited onto pads used in catalytic heaters, for example, and heated to precipitate the platinum onto the pads.

8 Claims, No Drawings

METHOD FOR PRECIPITATING PLATINUM METAL ON A SUPPORT

This is a division of application Ser. No. 348,075, filed Apr. 5, 1973.

This invention relates to a catalytic mixture, and more particularly to a catalytic mixture used to precipitate a catalytic material onto support pads of catalytic heaters.

Catalytic heaters use a carrier medium, such as a pad of woven, flame-resistant fibers, to support a catalytic material. A fuel is passed over the catalytic material, usually in the presence of air, whereat a combustible reaction occurs in the presence of the preheated catalytic material. This results in the generation of infrared, flameless heat which is radiated from the heater. This generated heat has many uses such as heating various buildings on farms which quarter animals and fowl life. It can also be used to heat remote locations such as unattended pumping stations. Recreational and camping facilities also make use of catalytic heaters.

An example of a catalytic heater of this type is disclosed and claimed in our U.S. Letters Patent No. 3,835,066 titled "Catalytic Mixture," issued Sept. 10, 1974.

Naturally, an important component of a catalytic heater is the catalytic material. Thus, it is important that the proper material be used and, additionally, that such material be applied to the carrier pad for long lasting and efficient use.

In the past, such metals as platinum, palladium and rhodium have been found to be quite useful as a catalytic material. Generally, platinum appears to be the most acceptable. However, platinum, as well as the other metals cannot be applied directly, in pure form, to the carrier pad. They must first be prepared in a mixture with other constituents which will react to precipitate out the catalytic metal. Additionally, the mixture should be in a form which is convenient to apply to the surfaces of the carrier pad in preparation for the reaction necessary for precipitation of the metal onto the pad.

It is an object of this invention, therefore, to provide a catalytic mixture which readily permits precipitation of a catalytic metal contained therein.

Another object of this invention is to provide a catalytic mixture which is easily applicable to a surface onto which the metal of the mixture is to be precipitated.

Still another object of this invention is a catalytic mixture which will easily impregnate a woven, flame-resistance, fiber-type carrier pad to facilitate ultimate application of the catalyst metal onto each fiber of the pad.

Other objects and attendant advantages of this invention will become more readily apparent and understood from the following detailed specificaiton.

In the preparation of a catalytic mixture, in accordance with the principles of the invention, to be used for precipitation of a catalytic metal therefrom onto a carrier pad, such as a substrate or a fiber pad, to be used with a catalytic gas heater, each such mixture includes selected amounts of platinum. For example, a salt of platinum, such as ammonium chloroplatinite, could be used as the platinum-based compound. Measured amounts of this compound are mixed with measured amounts of other constituents to form the catalytic mixture.

Specifically, it has been found that a precise blend of the catalytic mixture, sufficient to facilitate the desired precipitated level of platinum onto a carrier pad, would include 0.5 gram of a salt of platinum, such as ammonium chloroplatinite, which is mixed with 50 milliliters of a complexing agent such as dimethyl formamide and is mixed with and dissolved in sufficient hot water to make 400 milliliters of the catalytic mixture. When a mixture of these proportions is deposited onto a carrier pad and the pad is heated to a temperature at least above 400°F and preferably at about 750°F for a period of about four hours, the desired level of platinum will precipitate onto the pad. This level of platinum will provide for an efficient and long lasting use of the pad in a catalytic heater.

Another mixture includes 0.4 gram of ammonium chloroplatinite, 50 milliliters of dimethyl formamide and 150 milliliters of water.

In other specific blends, another salt of platinum is used. For example, various amounts of chloroplatinic acid can be mixed with other constituents to form a catalytic mixture of desirable qualities.

In one example, 5.112 grams of chloroplatinic acid are added with 12.24 grams of a high surface area refractory such as aluminum, or aluminum oxide, and 8.16 grams of dextrose and mixed with 7.4 milliliters of a complexing agent such as triethanolamine. This is then mixed with and dissolved in sufficient water to make up to 2400 milliliters of the catalytic mixture. In this instance it is preferable that the chloroplatinic acid contain about 40% platinum or, by weight, about 2.04 grams of platinum in the total of 5.112 grams of acid.

Additionally, a surface-active agent having dispersing properties, such as an agent commercially available under the name of Triton X-100 from the Rohm and Haas Company, can be optionally added to the last mentioned mixture to assist in dispersion of the mixture. Specifically, 2.5 milliliters of Triton X-100 should be added to obtain the desired results.

In another example, 0.2 gram of platinum as chloroplatinic acid is added to 0.65 gram of triethanolamine, 1.1 grams of alumina powder, 0.75 gram of dextrose and 150 milliliters of water.

In another example of using a salt of platinum, 0.25 gram of platinum such as chloroplatinic acid are added with 0.50 gram a reducing agent such as sodium citrate. This is then mixed with and dissolved in sufficient water to make up to 400 milliliters of the catalytic mixture.

In still another example of using a salt of platinum, 0.25 gram of platinum as chloroplatinic acid are added with 2.00 grams of a reducing agent such as sodium citrate. This is then mixed with and dissolved in sufficient water to make 400 milliliters of the catalytic mixture.

In using sodium citrate with chloroplatinic acid, the level of sodium citrate in the mixture should be at least twice the level of the chloroplatinic acid.

In each of the foregoing examples, the mixture can be deposited onto a carrier pad, such as a substrate, or impregnated into a carrier, such as a fiber pad of the type disclosed in my aforementioned copending application, and the coating mixture and pad subjected to a temperature of 750°F for about four hours to precipitate the catalytic metal onto the fibers of the pad. The pad can then be used in a catalytic heater efficiently in the generation of radiant heat and for a long service life.

While the foregoing specific examples have illustrated the use of platinum-based mixtures to generate the catalytic metal, other metals such as palladium and rhodium can be used.

Obviously many modifications and variations of the present invention are possible in light of the above teachings. It is, therefore, to be understood that within the scope of the appended claims the invention may be practiced otherwise than as specifically described.

What is claimed is:

1. A method for precipitating platinum metal onto support pads, comprising applying an aqueous solution of a mixture of chloroplatinic acid, dextrose, triethanolamine, and a high surface area refractory to the pads and heating the pads to precipitate platinum metal onto the pads.

2. The method of claim 1 wherein the pads are heated to a temperature about 400°F and 750°F.

3. The method of claim 1 wherein the high surface area refractory comprises aluminum oxide.

4. The method of claim 1 wherein the aqueous solution of the mixture consists of 5.112 grams of chloroplatinic acid, 12.24 grams of aluminum oxide, 8.16 grams of dextrose, 7.4 milliliters of triethanolamine, and sufficient water to form a total volume of approximately 2400 milliliters.

5. The method of claim 1 wherein the high surface area refractory comprises aluminum powder.

6. The method of claim 5 wherein the components of the aqueous solution of the mixture are present in the ratio of 0.2 of chloroplatinic acid, 1.1 of aluminum powder, 0.75 of dextrose, and 0.65 of triethanolamine.

7. A method for precipitating platinum metal onto support pads, comprising applying an aqueous solution of a mixture of chloroplatinic acid and sodium citrate to the pads and heating the pads to precipitate platinum metal onto the pads.

8. A method for precipitating platinum metal onto support pads, comprising applying an aqueous solution of a mixture of ammonium chloroplatinite and dimethyl formamide to the pads and heating the pads to precipitate platinum metal onto the pads.

* * * * *